United States Patent [19]
Lichty et al.

[11] Patent Number: 5,263,421
[45] Date of Patent: Nov. 23, 1993

[54] COAL FLY-ASH RAILWAY HOPPER CAR WITH 70 DEGREE MINIMUM SLOPE AND END SHEET ANGLE AND LONGITUDINAL DUAL PURPOSE LOADING HATCH

[75] Inventors: E. Ray Lichty, Hunt Valley, Md.; William A. Mullen, Berwyn, Pa.

[73] Assignee: Energy Resources & Logistics, Inc., Baltimore, Md.

[21] Appl. No.: 985,952

[22] Filed: Dec. 4, 1992

Related U.S. Application Data

[63] Continuation-in-part of Ser. No. 904,484, Jun. 25, 1992, abandoned, which is a continuation-in-part of Ser. No. 772,671, Oct. 7, 1991, abandoned.

[51] Int. Cl.⁵ .................. B61D 7/02; B61D 39/00
[52] U.S. Cl. .................... 105/248; 105/280; 105/290; 105/377
[58] Field of Search ............ 105/247, 248, 253, 280, 105/288, 289, 290, 306, 377

[56] References Cited

U.S. PATENT DOCUMENTS

| | | | |
|---|---|---|---|
| 986,981 | 3/1911 | Hern et al. | 105/248 |
| 1,071,699 | 9/1913 | Campbell | 105/248 |
| 1,121,165 | 12/1914 | Christianson | 105/248 |
| 2,899,912 | 8/1959 | Janeczko | 105/377 |
| 3,242,878 | 3/1966 | Floehr | 105/248 |
| 3,523,506 | 8/1970 | Williams | 105/377 |
| 3,596,609 | 8/1971 | Ortner et al. | 105/240 |
| 4,040,363 | 8/1977 | Walk et al. | 105/377 |
| 4,126,094 | 11/1978 | Zimmerle et al. | 105/377 |
| 4,362,111 | 12/1982 | Stark et al. | 105/247 |
| 4,601,244 | 7/1986 | Fischer | 105/240 |
| 4,884,511 | 12/1989 | Hallum et al. | 105/247 |
| 4,902,173 | 2/1990 | Hendee et al. | 105/358 X |
| 4,909,156 | 3/1990 | Erickson | 105/359 |
| 5,063,858 | 11/1991 | Dugge | 105/253 |

OTHER PUBLICATIONS

"Airslide Car" brochure; General American Transportation Corporation; Oct. 15, 1963.

*Primary Examiner*—Robert J. Oberleitner
*Assistant Examiner*—S. Joseph Morano
*Attorney, Agent, or Firm*—Rothwell, Figg, Ernst & Kurz

[57] ABSTRACT

A dual-purpose railway hopper car is constructed so that it is capable of holding, handling and hauling both coal and fly ash on different trips by virtue of having a plurality of quick opening hopper doors which are sealed to prevent leakage of fly ash when closed, highly sloping active walls, a covered top with a wide longitudinal hatch for loading coal, which wide hatch carries a smaller circular hatch for pneumatically loading fly ash. The coal hatch is operated by air cylinders from a quick connect coupling at ground level. A center sill covers the hopper door operating linkage.

8 Claims, 2 Drawing Sheets

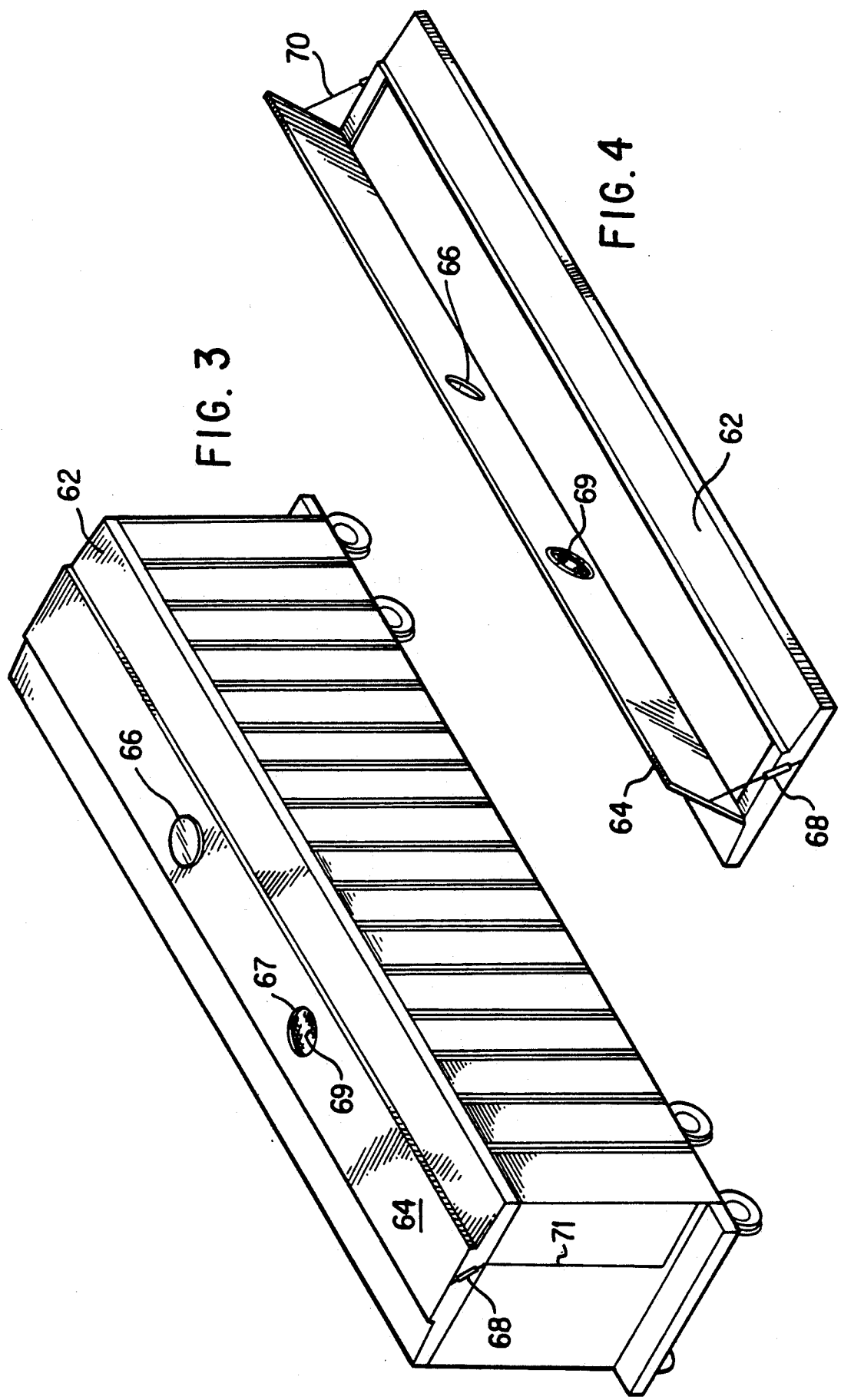

COAL FLY-ASH RAILWAY HOPPER CAR WITH 70 DEGREE MINIMUM SLOPE AND END SHEET ANGLE AND LONGITUDINAL DUAL PURPOSE LOADING HATCH

CROSS REFERENCE TO RELATED APPLICATIONS

This application is a continuation-in-part of application Ser. No. 07/904,484, filed Jun. 25, 1992, now abandoned, which, in turn, is a continuation-in-part of application Ser. No. 07/772,671, filed Oct. 7, 1991, now abandoned.

1. Field of the Invention

This invention relates to improvements in railway cars and particularly to a unique dual-purpose railway hopper car for hauling either coal or fly ash.

2. Prior Art and Background

Hopper cars are a well-known in the railroad car art. Typically, a hopper car has an open top and several hinged door openings in V-shaped bottoms and is used for hauling coal, gravel and the like. Usually, such hopper cars are loaded from above through their open top and discharge their contents through the bottom doors. Hopper cars are also known which are convertible for use with commodities such as grain, and which have been provided with a cover.

Hopper cars in use on railroads in the U.S. conform to A.A.R. size standards and equipment limit lines. Typical hopper cars are shown, for example, in U.S. Pat. Nos. 986,981 (1911), 1,071,699 (1913), 1,121,165 (1914), 3,242,878 (1966), 3,596,609 (1971) and 5,063,858 (1991).

For all power plants which burn coal, disposition of the fly ash resulting from burning the coal is a necessity. It would be desirable to have a single hopper car which could not only haul the coal into a power plant, but on a return trip from a power plant the same car could also haul fly ash out for environmentally correct disposal. However, fly ash is light and powdery, highly caustic, and is notoriously difficult to handle. Fly ash sometimes has the consistency of face powder, but it is very caustic and cementacious if wet, hence, very difficult to store and move.

There has long existed in the transportation art the need for a dual-purpose car which has the capability of transporting coal from coal-producing points to electric generating facilities and the transportation of powdery ash in the return direction to facilities licensed to dispose of such ash in a convenient and environmentally safe manner. The handling and hauling of powdery coal ash has been an extremely long-standing problem in the art. Ash, particularly fly ash, is extremely difficult to transport and dispose of because of its light, powdery and dusty nature, because it tends to agglomerate and not flow, particularly if damp, and because it is so caustic. Steam generators of all types produce, in addition to fly ash, bottom ash or boiler slag and flue gas desulfurization sludge. All of the waste may be removed at the same time and mingled, however, fly ash presents the greatest handling and transportation problem.

The Official Railway Equipment Register filed with the Interstate Commerce Commission by the American Association of Railroads lists and describes over 1,555,000 freight cars in the United States, Canada and Mexico combined. Not one of those cars is designed or suitable for the dual purpose of hauling coal in one direction and light powdery ash in the other direction.

There are, of course, many thousands of open-top cars suitable for transporting coal; most all of these are open-top hopper cars, but these are not commercially feasible for ash, particularly fly ash. There is also a wide variety of covered hopper cars that could be used for fly ash, but they would not be suitable and could not be used for coal. Public utilities and other power generators have been burning coal and producing ash for many, many years. For at least the last forty years, coal-burning public utilities and cogeneration plants generally have used a pulverized-coal boiler which results in a flue gas stream carrying substantial tonnages of fly ash which must be separated and collected. However, no railroad, private company or person has designed, built or used a railroad car specifically for the two-way traffic of coal and fly ash. Indeed, most of the fly ash is not and cannot be safely and adequately handled by rail at present. Rather, it is transported by trucks to dumps near the involved power facility. However, many of these dumps are now nearly filled and future use of trucks is highly problematical.

U.S. Pat. No. 5,056,858 discloses a covered hopper car with drop bottom doors and substantially vertical outlets to maximize discharge area. The covered hopper car disclosed in this patent, however, could not be used to haul coal and fly ash (and it is not suggested for such use) for several reasons. First of all, the end walls are not steep and the fly ash would stick to the end walls. Secondly, there is no provision for loading both coal and fly ash as the only loading inlets are for lading of materials such as corn gluten. While the covered hopper car of this patent may be suitable for corn gluten, it could not be used for coal and fly ash.

Several other patents in the prior art show a variation of individual features of the present invention, but contain no suggestion that such features could be used in a unique car for handling both coal and fly ash. For example, U.S. Pat. No. 3,596,609 discloses rapid discharge hopper car door actuators. The arrangement disclosed is for simultaneously opening doors of a hopper car but the hopper car could not handle fly ash because the sloping walls are not steep enough and there also are not enough doors in the bottom to accomplish quick unloading. Further, this patent does not disclose any cover or hatches in a cover.

Patents exist in the art which show dual opening hatches, i.e., a large hatch with small openings in it, however, such are clearly not for coal and fly ash and there is no suggestion that they could be for such because of their construction. See, for example, U.S. Pat. Nos. 3,523,506, 4,040,363 and 4,126,094, disclosing a smaller hatch in a larger hatch of a railway car, but such could not accommodate the environmentally difficult to handle fly ash.

While certain individual features of railway hopper cars, such as dual cover top openings, quick opening hopper doors and shaker brackets are generally known in the art, to date no high-efficiency combination hopper car capable of hauling both coal and fly ash is known or available and there is a great need in the art for such a dual-purpose hopper car. If fly ash is utilized in a known prior art hopper car of the type utilized for coal, there will be significant problems even if the car is covered or even if the doors open quickly.

SUMMARY OF THE INVENTION

This invention provides a unique combination hopper car for hauling coal to a power plant and fly ash from the power plant. A single covered hopper car has a plurality of hoppers, each with dual opening rapid discharge doors covering substantially the entire bottom of the hopper to completely open the bottom of each hopper simultaneously. Each interior wall of the hopper including the slope sheets has a very high slope angle of at least 70° for rapid discharge of the fly ash. The hopper doors are gasketed to contain the powdery fly ash. Additionally, the hopper car has a dual hatch cover, specifically, a wide hatch extending the length of the car which is operable by automatic means at ground level, and within that wide hatch is a smaller hatch for pneumatically loading fly ash and a vent hatch for venting the air used in loading the fly ash. The combination of these and other features to be described provides a hopper car that to date is the only hopper car capable of handling coal and fly ash for hauling and discharge by gravity.

BRIEF DESCRIPTION OF THE DRAWINGS

FIG. 3 is a perspective view of the hopper car showing a pneumatically operated hopper car hatch cover.

FIG. 4 is a perspective view of the hopper car through hatch cover with the hopper car through hatch open.

DETAILED DESCRIPTION OF THE PREFERRED EMBODIMENT

Figure 2:
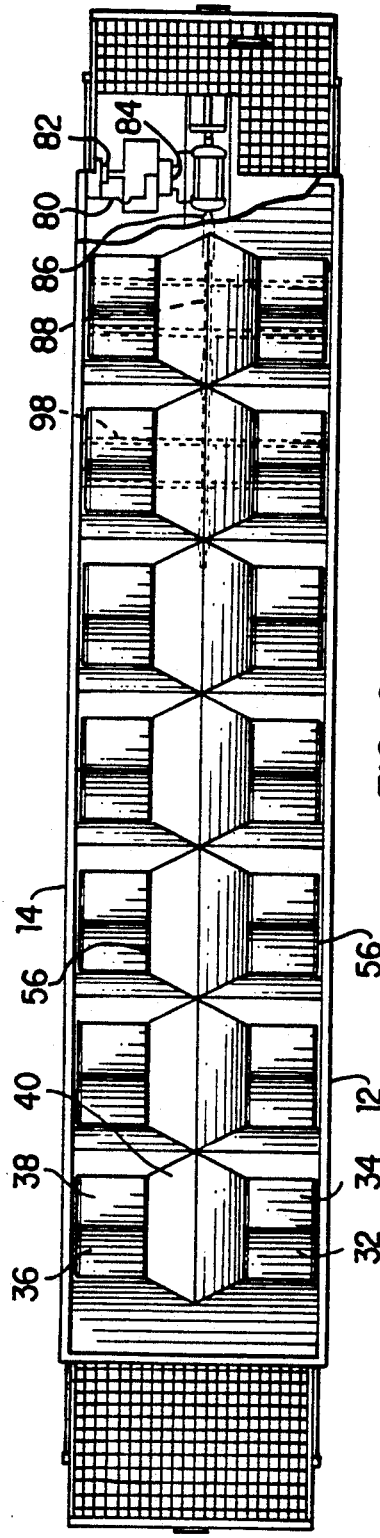
FIG. 2 is a top plan view of the hopper car of this invention with the roof removed.

With reference to the drawings, a railway hopper car 10 constructed of metal such as aluminum has two sides 12 and 14, two ends 16 and 18 and an enclosed load carrying space 20 with a plurality of hopper bottoms 22, 23, 24, 25, 26, 27 and 28. Each of the hopper bottoms has two pairs of hopper doors or gates as shown in FIG. 2. See, for example, hopper bottom 22 which has doors or gates 32 and 34 on one side and gates 36 and 38 on the other side of a central raised inverted V-shaped sill 40, see FIG. 2. Each of the other hopper bottoms similarly has four doors or gates, two on each side of the sill. As can be seen, the hoppers cover substantially the entire bottom. The doors are wide-opening doors and there are seven door openings, each of which is 9 feet by 3 feet, making 27 square feet per door opening or 189 square feet of opening in a standard size hopper car. The double doors (one for each pocket) are opened simultaneously and quickly by a simultaneous automatic door operator which may be of a type known in the art, as will be described hereinafter.

Figure 1:
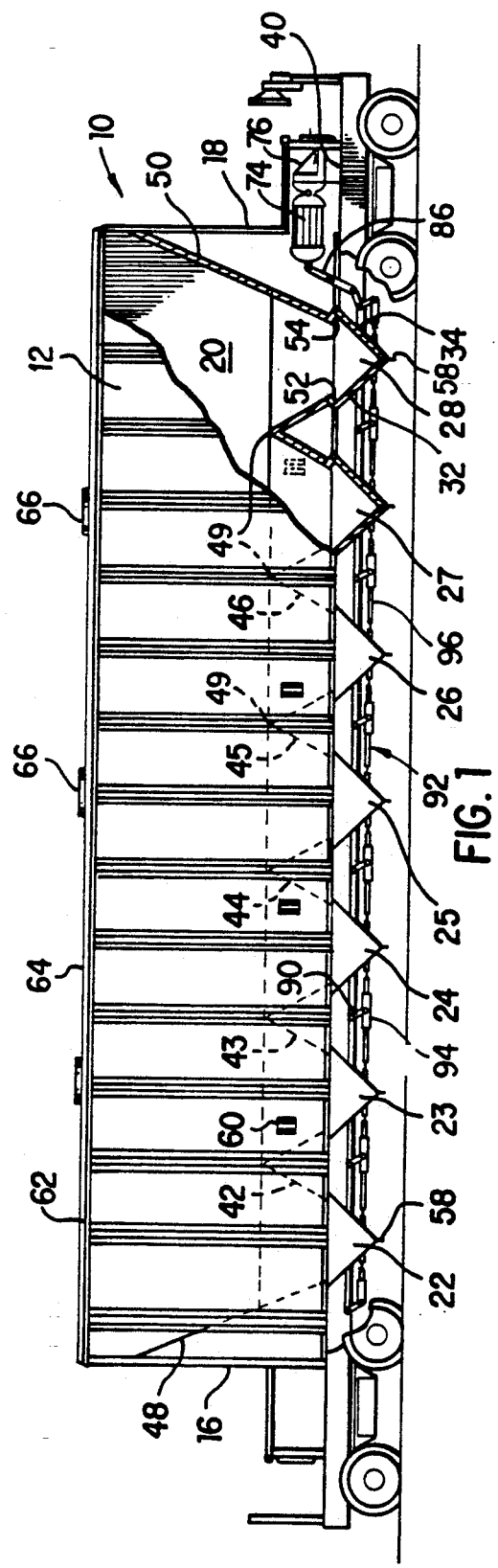
FIG. 1 is a side elevation view, partially in section, of the hopper car of this invention.

The hopper bottoms are separated by internal inverted V-shaped cross members 42, 43, 44, 45 and 46 as shown in FIG. 1 together with the end walls 48 and 50.

The inclination of the end walls or slope sheets 48 and 50 as well as the sides of the cross members 42, 43, 44, 45 and 46 is steep enough to allow free flow of fly ash as would be encountered in operation. In such cases, fly ash would typically also include some bed ash and would likely have some moisture in it, notwithstanding the fact that the car is covered. For example, the fly ash may have 0.5 total moisture content (wet basis measurement) and the bed ash may have 0.1% total moisture. There may, for example, be 75% fly ash and 25% bed ash in the materials handled or a different percentage. The end walls 48 and 50 and cross members 42, 43, 44, 45 and 46 must have a minimum slope of 70° as measured from the horizontal. Moreover, the top of each 70° mass flow peak should not be rounded but should have a knife edge such as edge 49 between cross members 45 and 46.

To promote maximum flow of contents from the hopper car, all bottom doors of the car must be opened together. Once the doors are opened, a zone of flowing material will extend across the entire plan dimension of the door openings and this dimension sufficiently exceeds a rat hole dimension for the ash materials hauled. Rapid door operating means for hopper cars are known, for example, as shown in U.S. Pat. No. 3,596,609 (1971). In the present invention, the rapid door opening is in combination with the steep walls and the covered top to provide the benefits.

Each of the hopper doors is hinged at its top end for opening. Hinges 52 and 54 are shown for hopper doors 32 and 34 in FIG. 1, and the remaining hopper doors all have identical hinges which therefore need not be described. The hinges are recessed behind the angled walls of the cargo space 20, namely, walls 48 and 50 and side members 42, 43, 44, 45 and 46 so as not to bear the load of the fly ash or other material in cargo space 20. Moreover, they are suitably protected from the environment by gaskets or the like.

Similarly, gaskets 56 are provided at the ends and otherwise around the doors to prevent the escape of the finely powdered fly ash or similar material. An extended lip 58 is provided on the ends of the mating doors for sealing purposes. In general, means are provided around the hopper doors or gates throughout the bottom of the cargo space to seal the doors against loss of fly ash or similar powdery material.

The outer walls on both sides 12 and 14 of the cargo space 20 may contain shaker brackets 60. These brackets are fixably attached to the sides of the cargo space 20 by welding or the like and include a slot for insertion of portable commercial vibrators to vibrate the walls of the hopper car should such be needed to assist in discharge of material. However, with this invention such external vibration is not a requisite.

The top of the hopper car is covered by a permanent cover 62 which has a wide longitudinal rectangular hatch 64 extending from end to end of the car. At least one smaller circular hatch 66 and one vent hatch 67 covered by a fly ash filter 69 are contained within the rectangular hatch 64. The important feature of the covered top is that the rectangular hatch 64 is very wide as compared to known prior art hatches for railway cars. Specifically, it is at least 3 feet wide and preferably 3½ foot wide so that the opening spouts of coal tipples may load through the wide hatch.

An air cylinder 68 having an operating arm 70 is positioned at each end of cover 62 and is connected to the hatch 64 so as to open the hatch when air pressure is applied to the open position as shown in FIG. 4 for loading coal or similar granular material into the cargo space 20 from above, e.g., by a coal tipple.

Each air cylinder 68 is connected to an air line 71 which terminates in a quick disconnect fitting 72. Thus, when it is desired to open the hatch 64, for example, at a coal terminal, a source of air pressure may be connected to quick disconnect coupling 72 at essentially ground level so that operating personnel need not climb the hopper car and the hatch 64 will open to the FIG. 4 position.

The small circular hatch 66 may be opened manually for insertion of tubular loading chutes to load fly ash, the loading chutes having the approximate diameter of the hatches so that fly ash is contained. Vent hatch 67 may be opened to allow air to escape when the car is being loaded with fly ash. Such venting is through fly ash filter 69 for environmental purposes. Also, the hatches are sealed by suitable gasket means (not shown) as is known in the art to prevent water or moisture from wetting the contents in cargo space 20.

For simultaneously opening of all the hopper doors in a quick and effective manner, a single large air cylinder 74 is positioned on a mounting bracket 76 attached to sill 40 of the hopper car. Air supply through line 80 is controlled by a pilot valve 82 and a directional control valve 84 to supply air to either end of air cylinder 74 to cause the air cylinder to move in either direction. Air cylinder 74 is connected to an operating lever 86 which in turn is connected to an elongated connecting link 88 within raised sill 40. The elongated connection link 88 is connected to the individual hopper doors or gates through the intermediary of an operating shaft lever 90 and a door operating assembly 92 having a central member 94 and connecting links 96 which are connected to shafts 98 extending across the width of the car to operate the gates simultaneously.

The preferable material for constructing the body of the hopper car is aluminum as test cars constructed of such emptied rapidly.

In the illustrated preferred embodiment, the hopper car is a 100-ton, 4,000-cubic-feet, hopper car with steep cross ridges for both coal and fly ash handling, and having a pneumatically operated rectangular longitudinal hatch 42 inches wide, with circular hatches 24 inches in diameter.

In operation, the hopper car is loaded with coal, for example, at a coal tipple, after air pressure is applied to quick disconnect fitting 72 and longitudinal hatch 64 is raised to the FIG. 4 position. The car is filled with coal and a train containing the car delivers the coal to a power plant.

The power plant is constantly burning coal and creating fly ash. For environmental purposes, the fly ash must be disposed of in an environmentally safe manner. One manner of disposing of fly ash is to place it in the ground where the coal was mined, e.g., back at the strip mine from which the coal came. In order to accomplish this, the fly ash must be hauled from the power plant to the mine. With this invention, the same hopper car which hauled the coal to the power plant can be used for the return trip of hauling fly ash back to the coal mine. Otherwise, the hopper car would go back empty and a vehicle especially suitable for handling fly ash would be needed.

For handling fly ash at the power plant, longitudinal hatch 64 is down and circular hatch 66 and vent 67 are open. A circular chute fits into opening 66 and delivers the fly ash to cargo space 20 via pressurized air which is vented through filter 69 and vent 67. Because of the construction which effectively seals the cargo space 20 of the hopper car from outside moisture, the fly ash contents do not get wet and, hence, do not cake or become more caustic. Further, when the car bearing the fly ash is hauled back to the mine, it may be unloaded in a manner similar to unloading of any other material carried in the hopper car, namely by opening the hopper doors or gates simultaneously and allowing the material to flow out by gravity. Because of the steep (70° or more) slope of the active hopper walls, the flow is greatly assisted. Additionally, if needed, portable shakers may be placed in the shaker brackets. It has been shown that use of this invention will allow the unloading of fly ash from hopper cars in about five minutes with ease.

It can be seen that this invention provides means and method for effectively handling fly ash with a significant conservation of energy because the same car which delivers coal to a power plant can remove fly ash from the plant.

We claim:

1. A dual-purpose railway hopper car capable of holding, handling and hauling coal and fly ash at different times in the same car, the car comprising:
    a railway hopper car body;
    a plurality of hoppers within the hopper car body, each of the hoppers having gated openings through most of the bottom of the hopper car body;
    doors positioned and hinged to move to close the hopper openings;
    means for quick opening of all of the hopper doors simultaneously;
    means for sealing the contact surfaces around the hopper doors to prevent leakage of fly ash from the hoppers when the doors are closed;
    end walls of the hopper car body and hopper bottom dividers extending at relatively steep angles of at least 70° to the horizontal;
    A top covering the hopper car body;
    an openable coal loading hatch at least 3 foot wide hinged to and extending without interruption continuously along the entire length of the top; and
    means for loading fly ash through and in conjunction with the wide coal loading hatch and operable independently thereof.

2. A dual-purpose railway hopper car as defined in claim 1, wherein the wide coal loading hatch is openable by automatic operator means by an operator positioned at ground level and wherein the fly ash loading means comprises at least one small fly ash loading hatch and at least one vent hatch with a filter, the hatches carried within and by the wide coal-loading hatch.

3. A dual-purpose railway hopper car as defined in claim 2, wherein the automatic operator means includes pneumatic cylinders at each end of the hopper car body connected to the coal loading hatch to open the coal loading hatch when the cylinders are operated.

4. A dual-purpose railway hopper car as defined in claim 3, further comprising air lines connected to the pneumatic cylinders and extending along the outside surface of the hopper car body to a point adjacent the bottom of the hopper car body so that the end of the air lines are reachable by a person standing at ground level.

5. A dual-purpose railway hopper car as defined in claim 4, wherein the air lines have a quick disconnect fitting for connection to a source of air pressure to operate the coal loading hatch.

6. A dual-purpose railway hopper car as defined in claim 5, further comprising shaker brackets affixed to the outside of the car body for receiving and holding a portable motorized shaker to shake the car body.

7. A dual-purpose railway hopper car as defined in claim 1, further comprising a center sill extending longitudinally of the car and dividing the hoppers, the sill covering at least a part of the means for quick opening of the hopper doors.

8. A dual-purpose railway hopper car as defined in claim 7, wherein the means for quick opening of the hopper doors includes an air cylinder connected to a series of levers which, in turn, are connected to each of the doors to open and close the doors simultaneously when the air cylinder is operated.

* * * * *